(12) United States Patent
Baosheng (10) Patent No.: US 7,160,426 B2
(45) Date of Patent: Jan. 9, 2007

(54) WATER TREATMENT APPARATUS (76) Inventor: Wang Baosheng, Room 403, No. 157, Longbai Er Village, Min Hang District, Shanghai (CN) 201103

( * ) Notice: Subject to any disclaimer, the term of this patent is extended or adjusted under 35 U.S.C. 154(b) by 78 days.

(21) Appl. No.: 11/072,206

(22) Filed: Mar. 1, 2005

(65) Prior Publication Data
US 2006/0196773 A1    Sep. 7, 2006

(51) Int. Cl.
*C02F 1/48*    (2006.01)

(52) U.S. Cl. .................. 204/660; 204/664; 210/222; 422/186.01

(58) Field of Classification Search ............... 204/557, 204/660, 664; 210/222
See application file for complete search history.

(56) References Cited

U.S. PATENT DOCUMENTS

| | | | | |
|---|---|---|---|---|
| 4,340,864 A | * | 7/1982 | Malinowski et al. | 327/113 |
| 4,914,399 A | * | 4/1990 | Doany | 330/10 |
| 4,938,875 A | * | 7/1990 | Niessen | 210/695 |
| 5,171,431 A | * | 12/1992 | Schulte | 210/94 |
| 5,514,283 A | * | 5/1996 | Stefanini | 210/695 |
| 5,581,037 A | * | 12/1996 | Kwun et al. | 73/623 |
| 5,670,041 A | * | 9/1997 | Cho et al. | 210/222 |

* cited by examiner

*Primary Examiner*—Roy King
*Assistant Examiner*—William T. Leader

(57) ABSTRACT

The present invention discloses a water treatment apparatus for treating a water flowing in a water pipe, the apparatus comprises an inductive coil, which is sleeved onto said water pipe, and a voltage signal unit, which is electrically connected to the inductive coil for forming a voltage signal of a predetermined frequency to the inductive coil so as to generate an electromagnetic field to treat the water.

20 Claims, 5 Drawing Sheets

WATER TREATMENT APPARATUS

BACKGROUND OF THE PRESENT INVENTION

1. Field of Invention

The present invention relates to water treatment system, more particularly, relates to water treatment apparatus for treating flowing water within a water pipe so as to change washing or cleaning capability and surface activity of the flowing water by applying an inductive coil sleeved onto the water pipe.

2. Description of Related Arts

Clean water is essential for everyday life, especially for people living in $21^{st}$ century, during which a friendly living environment is highly desirable. A variety of water treatment systems have been introduced to treat or purify water so that it is safe to drink. As its name applies, water treatment system is adapted to remove harmful pollutants from domestic and industrial running water so as to guarantee water safe to be served to business facilitates and household residences.

There are many different techniques which are used in order to treat water, including chemical, magnetic and electric treatments, all of which seek to remove undesired solid particles which are dissolved or held in suspension in a body of water.

In short, those water treating methods could be merely sorted into two major categories, namely, chemically treating method and physically treating method. For most users, the chemically treating steps are easy to follow. Unfortunately, this convenient treating method is not effective and safe. This is due to the fact that the chemical substance being used for treating water is susceptible to remain within the water so as to generate unwanted residual products as well as secondary pollution. As a result, physically treating method, i.e. magnetic and electric treatment, is widely welcomed by most users. Various systems are known for treating water or other solutions by introducing electric or magnetic energy. With such method, a plurality of electrical circuits was provided for controlling the electromagnetic field surrounding the flowing water pipe so as to improve the water quality.

Conclusively, the physically treating method utilizes electromagnetic energy to inhibit, prevent, reverse or alter the formation of rust or scale on various contacting surfaces, and more importantly, remove unwanted solid particles. That is to say, an electromagnetic signal at a predetermined frequency would be generated to treat the flowing water. The frequency of the treatment signal, preferably between 0.1 KHz and 1000 MHz, is generated for providing an ultimate cleaning effect.

Commonly, to apply such electromagnetic signal for changing the quality of water, at least two electrodes are disposed soaking in the flowing water, so that the flowing water is given energy by applying DC voltage between those electrodes. Or otherwise, there is a casing or plate disposed into the water, wherein the magnets are attached to the casing or the plate so that they can be attached to a conduit to generate electromagnetic energy for cleaning the water. As a result, the impurities, such as sludge, organisms, or any unwanted particles could be coagulated, decomposed, sterilized, and separated by applying a voltage of a predetermined frequency between those two electrodes.

However, in conventional water treating methods, one of the electrodes is used as one with positive polarity, whereas the other one with negative polarity, and therefore, the electrodes are opted to be contaminated by deposited electrolysis substance after a time of period, thereby preventing transfer of electricity therebetween. As a result, for maintaining the effective performance of the electrodes, the electrodes must be periodically changed.

On the other hand, the conventional art also includes a method for disposing at least one oscillating coil into the water for treating purpose. For most applications, the oscillating coils are received within a housing having closed ends so as to form a water-tight chamber, and the coil is adapted for delivering a magnetic field into the water. Generally, at least one electric field probe is coupled to the coil for delivering an electric field into the water, and necessary coupling means are provided for electrically coupling such coil and probes. Upon being charged with a current, the coil is adapted to generate shock waves for treating water.

Since the electric field probe should be contained within a chamber containing a fluid electrically isolated from the water, the manufacturing process of such water treatment apparatus would be rather complicated. What is more, the intensity of energy measured from the water treatment apparatus could not be varied responsible to different sizes of flowing water pipe. In other words, the conventional water treatment apparatus are not flexible in routine applications.

Furthermore, the coil soaked within the water would consume considerable electrical energy, thus making the water treatment apparatus unaffordable to most customers. In addition, the equipment for use in practicing this method is large and requires a large installation area. To sum up, the conventional water treating equipment not only is expensive but also involves a high cost for its maintenance and operation.

SUMMARY OF THE PRESENT INVENTION

A primary object of the present invention is to provide a water treatment apparatus, wherein no electric probes or water-tight coil chamber are required to be disposed within the water for accomplishing the water treating process of conventional arts, instead, an inductive coil is provided wrapping around the water pipe for treating the water flowing therein.

Another object of the present invention is to provide a water treatment apparatus for providing electromagnetic field to flowing water, wherein the water treatment apparatus is easy to manufacture, convenient to operate, so as to overcome drawbacks of conventional treatment apparatus.

Another object of the present invention is to provide a water treatment apparatus, wherein a digitized voltage signal of certain value of electromagnetic energy is provided to the inductive coil sleeved onto the water pipe so as to greatly vary the oxidation-reduction potential and oxidation potential of the water flowing through the water pipe, therefore resulting in an electrochemical reaction so as to fractionate and remove contaminated particles in the water and promote the decomposition, sterilization and separation of the unwanted particles of the water.

Another object of the present invention is to provide a water treatment apparatus, wherein no chemical substances would be required for accomplishing such treating process, instead, the unwanted chemical particles of the flowing water could be decomposed, sterilized, and separated so as to promote the watering treatment performance.

Another object of the present invention is to provide a water treatment apparatus, wherein the electromagnetic coil is sleeved on the water pipe for providing electromagnetic energy so as to treat the water flowing through the water pipe, therefore, the apparatus installation area could be greatly minimized. As a result, the water treatment apparatus of the present invention is user friendly.

Another object of the present invention of the present invention is to provide a water treatment apparatus with a reasonable cost, and increased efficiency, and more importantly, the water treatment apparatus is capable of meeting varying requirements of water treating process.

Another object of the present invention is to provide a water treatment apparatus, wherein no complicated or expensive structure or equipments are required for accomplishing such water treating effect.

Another object of the present invention is to provide a water treatment apparatus, wherein the power source for providing a voltage signal is generated by a photovoltaic solar panel unit or a wind generator so as to save considerable electric energy and reduce the electricity consumption.

Accordingly, to achieve the above mentioned objects, the present invention provides a water treatment apparatus for treating a water flowing in a water pipe, the apparatus comprising:

an inductive coil, which is sleeved onto the water pipe;

a voltage signal unit, which is electrically connected to the inductive coil for forming a voltage signal of a predetermined frequency to the inductive coil, wherein the voltage signal unit comprises:

a variable voltage generator, which is adapted to generate a voltage signal;

a voltage/frequency converter, which is electrically coupled to the variable voltage generator for receiving the voltage signal and converting the voltage signal into a frequency signal;

a high frequency oscillator for outputting a high frequency signal;

a carrier modulator, which is electrically connected with the voltage/frequency converter and the high frequency oscillator for modulating the frequency signal and the high frequency signal into a mixing signal; and a dual path driving circuit coupled to the carrier modulator for amplifying the mixing signal and for directing the amplified mixing signal into two ends of the inductive coil so as to generate an electromagnetic field for treating the water.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1–FIG. 5, the digitalized water treatment apparatus according to the preferred embodiment of the present invention is illustrated. The water treatment apparatus 1 of the present invention is adapted for treating a water flowing in a water pipe 2. The water treatment apparatus 1 comprises an inductive coil 10 which is sleeved onto the water pipe, and a voltage signal unit 20 which is electrically connected to the inductive coil 10 for forming a voltage signal of a predetermined frequency to the inductive coil 10, wherein the voltage signal unit 20 comprises a variable voltage generator 21, which is adapted to generate a voltage signal, a voltage/frequency converter 22, which is electrically coupled to the variable voltage generator 21 for receiving the voltage signal and converting the voltage signal into a frequency signal, a high frequency oscillator 23 for outputting a high frequency signal, a carrier modulator 24, which is electrically connected with the voltage/frequency converter 22 and the high frequency oscillator 23 for modulating the frequency signal and the high frequency signal into a mixing signal, and a dual path driving circuit 25 coupled to the carrier modulator 24 for amplifying the mixing signal and for directing the amplified mixing signal into two ends of the inductive coil 10 so as to generate an electromagnetic field for treating the water flowing through the water pipe 2.

Figure 1:
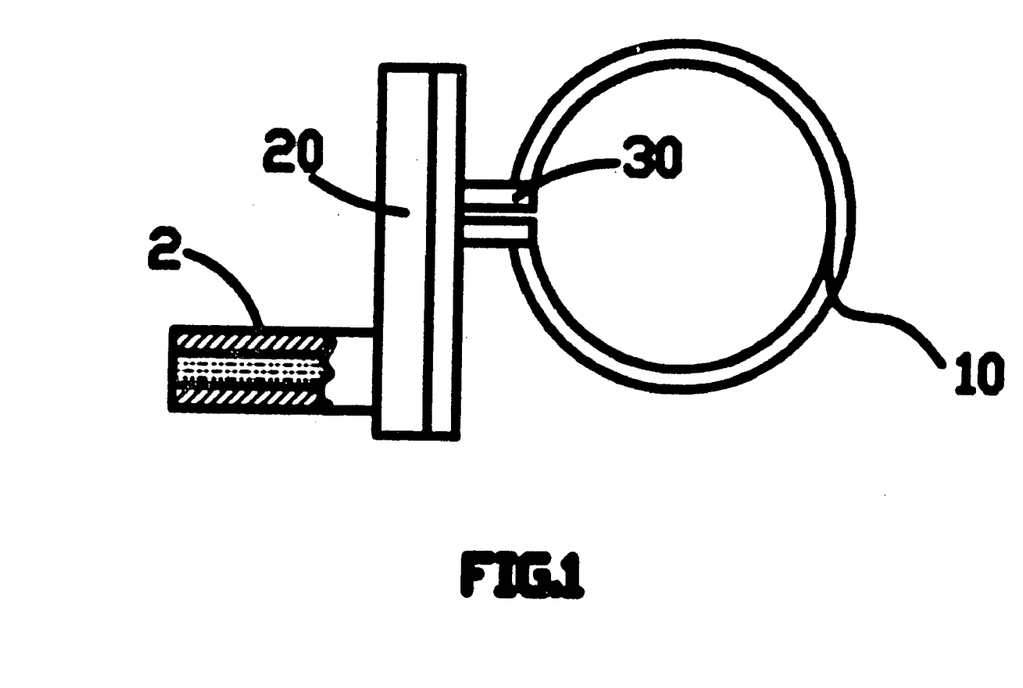
FIG. 1 is a schematic view of the water treating apparatus according to the preferred embodiment of the present invention.

In other words, the inductive coil 10 of the present invention is sleeved onto a water pipe through which the water flows for snugly wrapping up the water pipe. The inductive coil 10 is intended to be powered by an alternating current source generated by the voltage signal unit 20. What is more, the voltage unit 20 is made up of a variable voltage generator 21, which is embodied as a wave source, and more importantly, the variable voltage generator 21 is electrically connected with a plurality of circuit components so that during an operation, a high resonant frequency could be provided to supply the inductive coil 10.

It is noted that such high frequency signal is many times greater than the original frequency of the variable voltage generator 21. According to the present invention, the voltage signal unit 20 is adapted to convert the voltage signal having a frequency ranging from 60 Hz to 60 KHz into the mixing signal, which is an alternating pulse induction potential, of a frequency ranging from 400 Hz to 1 MHz. As a result, the frequency signal of the electromagnetic flux would be passing through the center of the coil, and the water pipe 2, commonly made of metal materials like steel, would be embodied as a metal core wrapped by the inductive coil 10. Therefore, the water flowing through the water pipe 2 would be shearing cross the magnetic line of the flux so as to prevent any oxidation-reduction reaction of particles of the water.

Here, according to the preferred embodiment of the present invention, the variable voltage generator 21 is electrically charged by a solar photovoltaic panel 211 which comprises at least 36 photo cells and is designed with a 17.8/125 PCS (power conversion system) standard, with a peak power of 10 W. Or otherwise, the variable voltage generator 21 could be supplied by a wind generator 212. It is noted that the solar photovoltaic panel 211 and the wind generator 212 could be individually applied or collectively applied to provide an optimal performance.

In short, the voltage signal unit 20 is adapted to convert the voltage signal generated from the voltage generator 21 into an alternating pulse inductive signal. In turn, such alternating pulse inductive signal is ultimately coupled to two sides of the inductive coil so as to provide an electromagnetic energy towards the water flowing through the pipe wrapped by the inductive coil 10.

Furthermore, the water treatment apparatus 1 of the present invention comprises a coil coupler 30 for electrically coupling the voltage signal unit 20 and the inductive coil 10. It is worth to mention that the coil coupler 40 is adapted to electrically connect the inductive coil 10 and the voltage signal unit 20 with a variety of manners so as to treat different water pipes. That is to say, the inductive coil 10 could be electrically connected with the power unit 30 in a series manner, i.e. in a parallel manner or in a series-parallel or any other mixing connection fashion. To sum up, the inductance provided by the water treatment apparatus could be adjusted to be applied to water pipes of varying size.

That is to say, the amplified mixing signal directed to the inductive coil 10 could be adjusted by applying the coil coupler 30 so as to alter the frequency of the voltage signal to a desired frequency to suit the diameter of water pipe or treat different water quality.

Preferably, the maximum power of the variable voltage generator 21 is ranging from 16.5–17.5 W, the maximum current is ranging from 0.57–0.61 A. The short-circuit current is 0.65 A, the short-circuit voltage 21.5, the insulating property is more than 100M withstanding, the voltage standoff is AC2000V, DC3000V respectively. The mechanic property is showing below: wind bearing property: 60 m/s (200 kg/m$^2$), the impact resistance is capable of withstanding high intensity of impact. The hail impact test indicates that such panel could withstand 225 g Iron ball falling from 100 cm height. Furthermore, it is noted that the photovoltaic panel is curved defined and fixed and orientated towards south direction at an angle of 30°.

In case of the wind generator is applied, the wind generator is an electric generator widely used for mini-size vehicle, and blades are applied as propeller blades.

Furthermore, the variable voltage generator 21 comprises a power control, which is defined to output a voltage between Vmix=14V and Vmin=8.6V. A storage battery 213 is provided for cooperating with the variable voltage generator 21, wherein the storage battery 213 is maintaining-free style and has a capacity of 12 AH, or in a range between 12–24 AH. It is noted that the working power supply of the variable voltage generator is of AC 0–1 A and the working voltage is less than AC5V.

Figure 4:
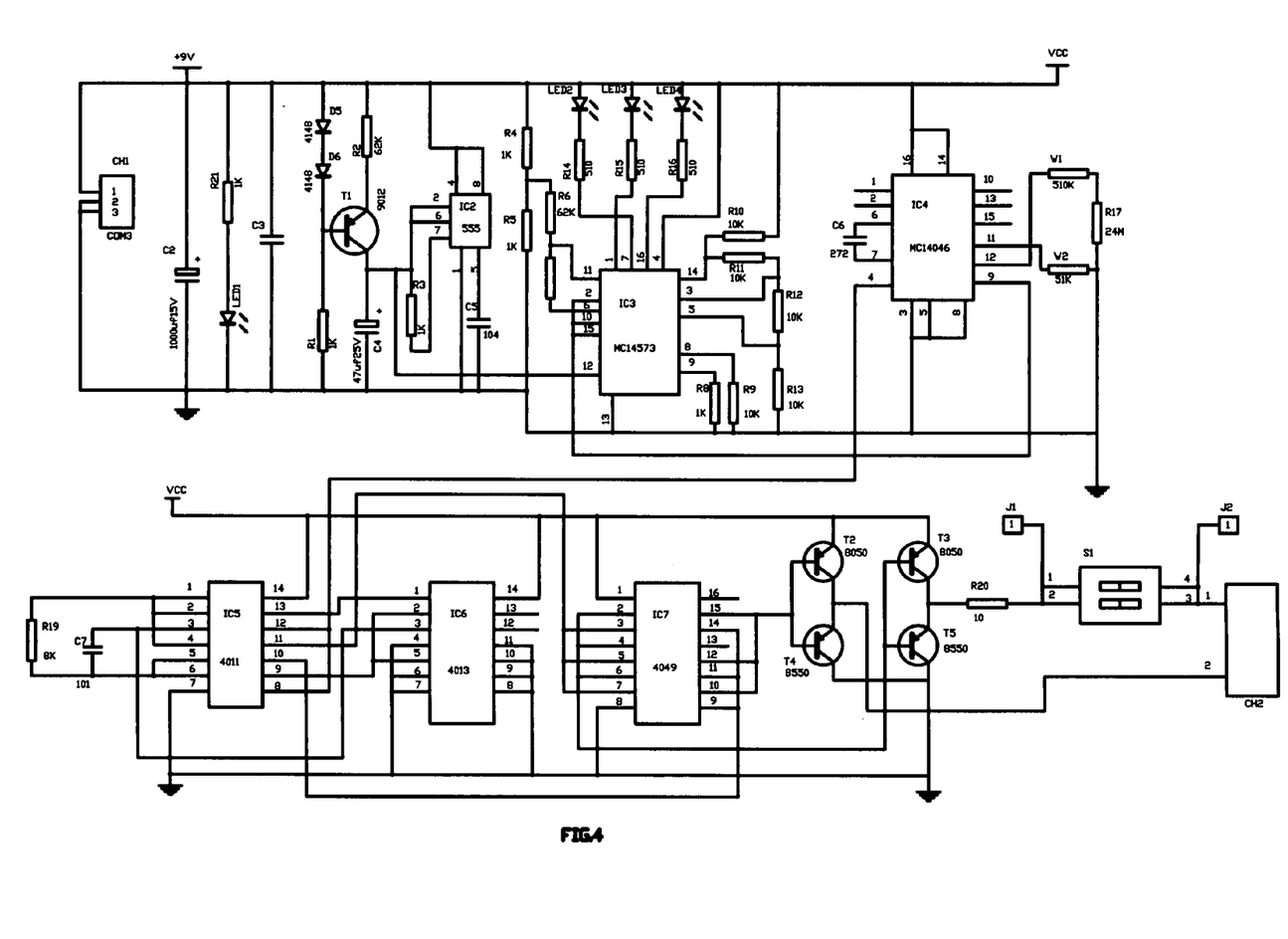
FIG. 4 is an electric diagram of the signal generator of the above preferred embodiment of the present invention.
Figure 5A:
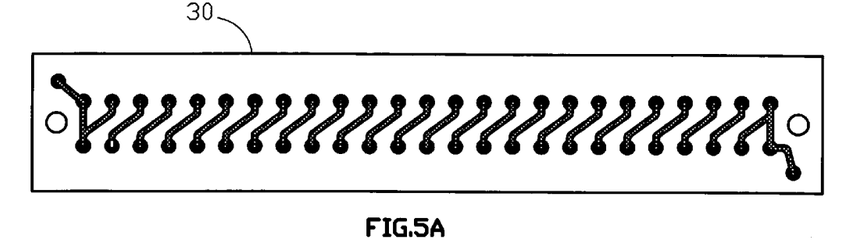
FIG. 5 is a schematic view illustrating four connection mode of the inductive coil connector according to the above preferred embodiment of the present invention.
Figure 5B:
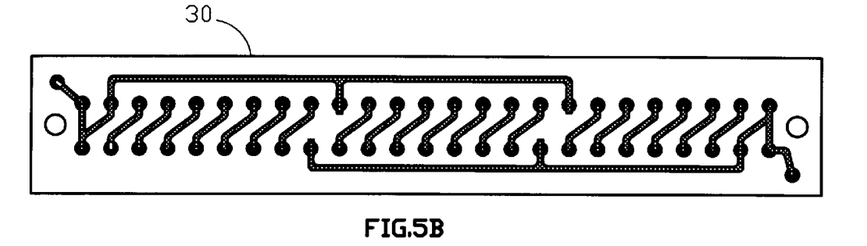
Figure 5C:
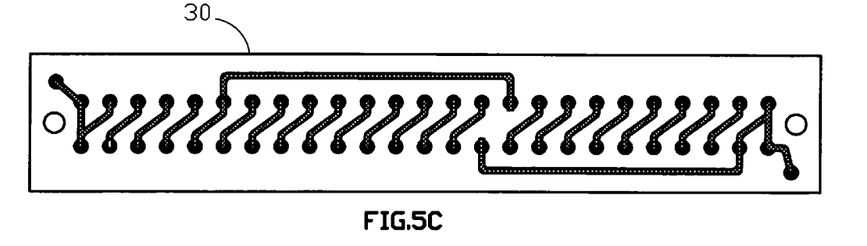
Figure 5D:
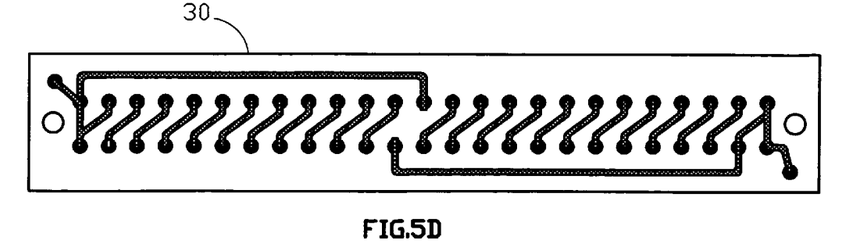

Referring to FIG. 4, the circuit diagram of the voltage signal unit 20 according to the preferred embodiment of the present invention is illustrated. The voltage signal unit 20 comprises a variable-voltage generator 21 having an integrated circuit CHI, an oscillating integrated circuit IC2, and a mixing circuit, wherein the variable-voltage generator 21 is adapted to periodically generate saw-tooth voltage, sine-wave voltage, or any other functional waves. Here, the integrated circuit is of CON3 mode. Preferably, the oscillating integrated circuit IC2 is a base integrated circuit of 555 inches size. Furthermore, the power/frequency converter 22 comprises an integrated circuit IC3, which is able to generate a varying pulse responsible to the variation of the inputting voltage signal. It is noted that the varying range of the pulsed frequency is within a range from 400 Hz to 60 KHz. Preferably, the mode of integrated circuit IC3 is MC14573(Quad Op Amp). The mixing circuit comprises an integrated circuit IC4, and a capacitor C4. Here, the integrated circuit IC4 is of MC14046.

According to the present invention, the high-frequency oscillator 23 is equipped with high-frequency setting means, and the carrier modulator 24 is coupled to the high-frequency oscillator 23 for supplying a series of mixed signal to the inductive coil 10. In other words, the carrier modulator 24 is functioned as an alternate switching commander adapted for converting the frequency signal outputted from the power/frequency converter 22 and the high-frequency oscillator 23 into an alternating pulse signal.

As the circuit diagram shown in FIG. 4 and FIG. 5, the high frequency oscillator 23 and carrier modulator 24 are made up of an integrated circuit IC5, an integrated circuit IC6, and an integrated circuit IC7, wherein R19, C6 are electrically coupled to IC5 to define the high frequency oscillator 23 for generating an alternate signal with a oscillating frequency ranging from 400 KHz to 1 MHz.

The oscillator signal here is carrier signal, and the mode of IC5 is of 4011 mode. Furthermore, IC6 is a frequency-splitter of a 4013 mode, and IC7 is a frequency-modulating circuit of 4049 mode. According to the preferred embodiment, the carrier modem is adapted for modulating the pulse output from the voltage/frequency converter 22 by the carrier signal so as to generate a high frequency compound wave. Furthermore, the compound wave is divided into two separate signals.

What is more, the two path driving circuit 25 comprises two pairs of push-pull triodes T2, T3, T4, and T5, and is adapted to amplify the compound wave. It is noted that the output of the variable-voltage generator 21 is coupled to the input channel of the voltage/frequency converter 22, so that the outputting frequency from the voltage/frequency converter 22 and the outputting frequency from the high frequency oscillator 23 are capable of being directed into the carrier modulator 24 to be mixed. The detailed principles of the diagram could be explained below: the signal output from the pin 4 of the IC5 is sent to the pulse input channel pin 3 so as to generate scaling-down action; afterwards, the divided signal is outputted from pin 1 and pin 2 of the IC6, and then, directed to pin 9, pin 13 of the input side of the IC5 wherein the output signal is modulated with the circuit within the IC5 chips so as to generate compound wave. Afterwards, the compound wave is directed into IC17, wherein the pin 11 of the IC5 is coupled to pin 3, pin 5, and pin 7 of the IC7, on the other hand, pin 10 of IC5 is coupled with the pin 14 of IC7, finally, the signal will directed via the frequency-modulation circuit will send to two pairs of push-pull triodes T2, T3, T4, and T5 to be amplified.

According to the preferred embodiment of the present invention, the inductive coil 10 is sleeved onto the water pipe 2 and is adapted to generate different inductance depending on water quality. As a result, electrolytes within the water would be activated to produce a series of electrode reactions responsive to the strength/weakness index of the electrolytes, so as to generate different oxidation-reduction products, therefore ultimately altering the pH value of balanced state of water as well as the content of $CO_2$, and content of active oxygen.

Figure 2:
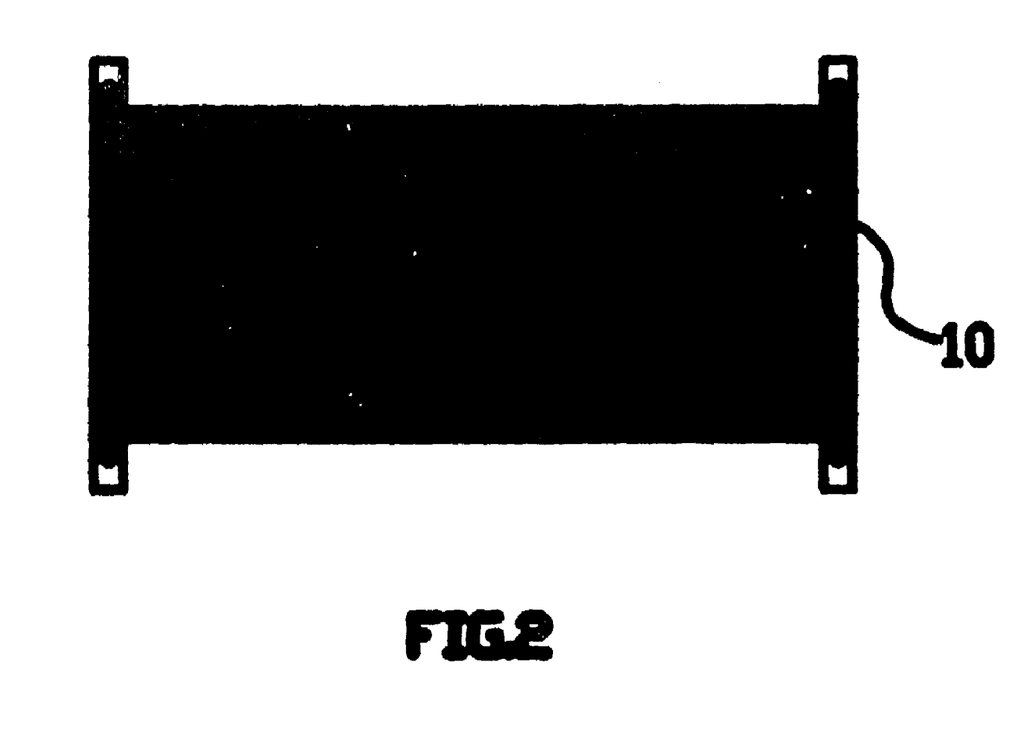
FIG. 2 is a perspective view of the inductive coil according to the above preferred embodiment of the present invention.
Figure 3:
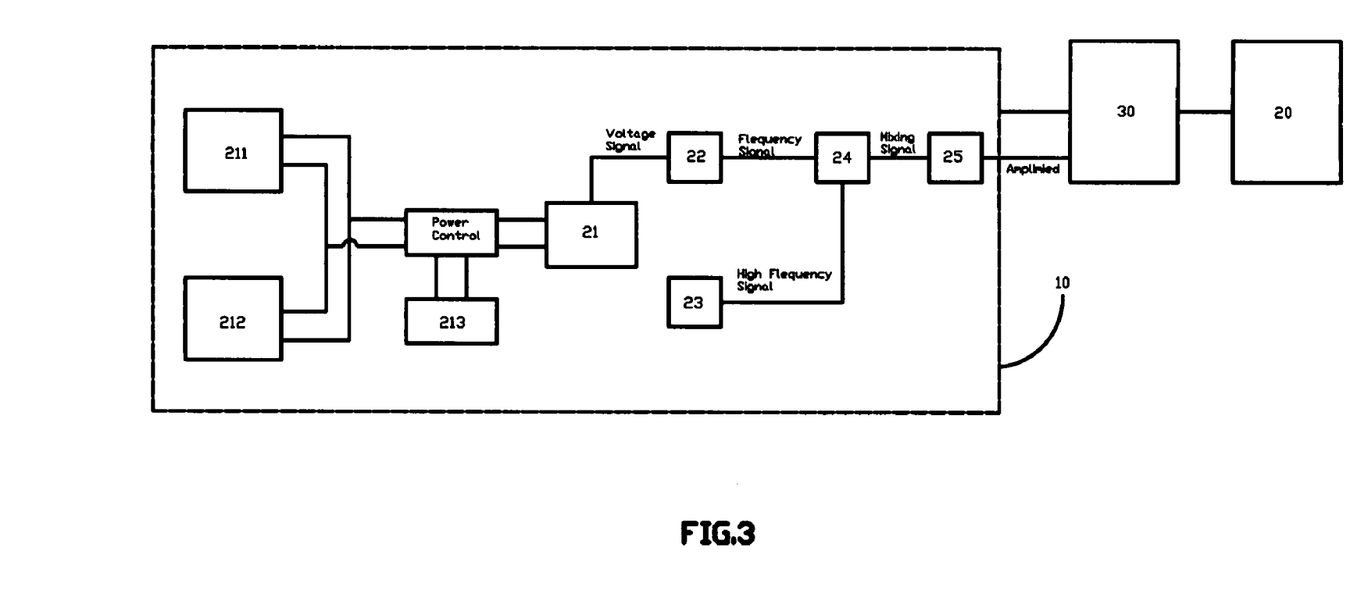
FIG. 3 is a schematic diagram of the signal generator of the above preferred embodiment of the present invention.

Referring to FIG. 2, the inductive coil according to the preferred embodiment of the present invention is illustrated. At least five slots and windings are provided for making up the inductive coil 10. Accordingly, the slots and winding are determined by the water quality of the water to be treated. It is noted that the length of the inductive coil are also related with the dimensions of the water pipe. Preferably, the inductive coil 10 is fittingly and smoothly sleeved onto the water pipe so as to wrap up the water pipe 2 in a loose manner.

It is worth to mention that such variable voltage generator 21 is capable of supplying the load, such as a water treatment apparatus of the present invention, or a light-control inductive illumination system. Here, the storage battery is supposed to ensure the water treatment apparatus could be used during undesirable conditions, such as bad weather, or nighttime utilization. It is noted that the storage battery could be worked with a temperature ranging from −25° C. to 60° C., and could be work consecutively more than 15 days.

Conclusively, the water treatment apparatus of the present invention are off-limited with water, instead, an inductive coil 10 is provided for wrapping up the water pipe 2 so as to treat the water flowing therethrough. That is to say, for those water pipes made of metal materials, the water pipe is directly applied as the metal core. As a result, whenever the inductive coil 10 is electrically charged, an alternate electromagnetic field would be generated around the water pipe 2. The flowing water is capable of shearing cross the electromagnetic line so as to produce different generated voltage, therefore initiating chemical reaction within the flowing water. In turn, such chemical would alter, inhibit, delay, even prevent the crust, scale and dirt particles from being created, and more importantly, delay or prohibit the reaction chain of such particles. The water quality could be improved effectively by equipping with such apparatus. According to the present invention, water flowing through the water pipe equipped with the inductive coil could be improved to meet the water source standard.

Preferably, the outputting signal from the variable voltage generator 21 further comprises ultrasound wave for strengthening the anti-bacteria function and promoting the coagulating process of the solid particles. What is more, the inductive coil 10 could inhibit the creation of the oxidation protection membrane on the inner wall of the water pipe.

According to the present invention, the voltage signal unit 20 could be further categorized into an adjustable mode and an unadjustable mode. In case the water quality is complex, the outputting frequency of voltage signal unit 20 is set with the adjustable mode, so that user could set an optimal outputting frequency directed into the inductive coil 10. On the other hand, for the residential water supplying system, the outputting frequency could be fixed to a predetermined value.

Compared with conventional arts, there is no coil carrier provided in the present invention, so that the manufacturing costs would be greatly reduced. Undoubtedly, the water quality could be improved effectively with the water treatment apparatus of the present invention. Furthermore, the water treatment apparatus of the present invention is much reliable and simple to be manufactured.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A water treatment apparatus for treating a water flowing in a water pipe, the apparatus comprising:
   an inductive coil, which is sleeved onto said water pipe; and
   a voltage signal unit, which is electrically connected to said inductive coil for sending a voltage signal of a predetermined frequency to said inductive coil, wherein said voltage signal unit comprises:
   a variable voltage generator, which is adapted to generate a voltage signal;
   a voltage/frequency converter, which is electrically coupled to said variable voltage generator for receiving said voltage signal and converting said voltage signal into a frequency signal;
   a high frequency oscillator for outputting a high frequency signal;
   a carrier modulator, which is electrically connected with said voltage/frequency converter and said high frequency oscillator for modulating said frequency signal and said high frequency signal into a mixing signal; and
   a dual path driving circuit coupled to the carrier modulator for amplifying said mixing signal and for directing said amplified mixing signal into two ends of said inductive coil so as to generate an electromagnetic field for treating said water.

2. The water treatment apparatus, as recited in claim 1, further comprising a coil coupler for electrically coupling said voltage signal unit and said inductive coil, wherein said coil coupler is adapted to connect said inductive coil and said voltage signal unit with a plurality of connection manners selected from a group consisting of parallel connection, series connection, and series-parallel connection, so as to treat different size of said water pipe.

3. The water treatment apparatus, as recited in claim 2, wherein said mixing signal is an alternating current source having a high resonant frequency ranging from from 400 Hz to 1 MHz, which is much higher than an original frequency ranging from 60 Hz to 60 KHz of said voltage signal outputted from said variable voltage generator.

4. The water treatment apparatus, as recited in claim 3, wherein said variable voltage generator comprises an integrated circuit, an oscillating integrated circuit and a mixing circuit for facilitating said variable voltage generator to periodically generate functional waves including saw-tooth wave and sine-wave.

5. The water treatment apparatus, as recited in claim 4, wherein said power/frequency converter comprises an integrated circuit for generating a varying pulse responsible to a variation of said voltage signal, wherein said varying pulse is ranged from 400 Hz to 60 KHz.

6. The water treatment apparatus, as recited in claim 3, wherein said variable voltage generator further outputs an ultrasound wave for strengthening anti-bacteria function and promoting coagulating process of said electromagnetic field.

7. The water treatment apparatus, as recited in claim 2, wherein said variable voltage generator is electrically charged by a solar photovoltaic panel having at least 36 photo cells and a 17.8/125 PCS standard, and a wind generator, wherein said solar photovoltaic panel and said wind generator are individually applied or collectively applied to provide said variable voltage generator an optimal performance.

8. The water treatment apparatus, as recited in claim 7, wherein said variable voltage generator comprises a power control, which is defined to output a voltage between Vmix=14V and Vmin=8.6V, and a storage battery for cooperating with said variable voltage generator, wherein said storage battery is of maintaining-free style and has a capacity in a range between 12–24 AH.

9. The water treatment apparatus, as recited in claim 1, wherein said mixing signal is an alternating current source having a high resonant frequency ranging from from 400 Hz to 1 MHz, which is much higher than an original frequency ranging from 60 Hz to 60 KHz of said voltage signal outputted from said variable voltage generator.

10. The water treatment apparatus, as recited in claim 9, wherein said variable voltage generator comprises an integrated circuit, an oscillating integrated circuit and a mixing circuit for facilitating said variable voltage generator to periodically generate functional waves including saw-tooth wave and sine-wave.

11. The water treatment apparatus, as recited in claim 10, wherein said power/frequency converter comprises an integrated circuit for generating a varying pulse responsible to a variation of said voltage signal, wherein said varying pulse is ranged from 400 Hz to 60 KHz.

12. The water treatment apparatus, as recited in claim 11, wherein said high frequency signal is a carrier signal for facilitating said carrier modulator to modulate said frequency signal from said voltage/frequency converter into said mixing signal.

13. The water treatment apparatus, as recited in claim 12, wherein said dual path driving circuit comprises two pairs of push-pull triodes for amplifying said mixing signal.

14. The water treatment apparatus, as recited in claim 10, wherein said high frequency signal is a carrier signal for facilitating said carrier modulator to modulate said frequency signal from said voltage/frequency converter into said mixing signal.

15. The water treatment apparatus, as recited in claim 14, wherein said dual path driving circuit comprises two pairs of push-pull triodes for amplifying said mixing signal.

16. The water treatment apparatus, as recited in claim 9, wherein said high frequency signal is a carrier signal for facilitating said carrier modulator to modulate said frequency signal from said voltage/frequency converter into said mixing signal.

17. The water treatment apparatus, as recited in claim 9, wherein said dual path driving circuit comprises two pairs of push-pull triodes for amplifying said mixing signal.

18. The water treatment apparatus, as recited in claim 9, wherein said variable voltage generator further outputs an ultrasound wave for strengthening anti-bacteria function and promoting coagulating process of said electromagnetic field.

19. The water treatment apparatus, as recited in claim 1, wherein said variable voltage generator is electrically charged by a solar photovoltaic panel having at least 36 photo cells and a 17.8/125 PCS standard, and a wind generator, wherein said solar photovoltaic panel and said wind generator are individually applied or collectively applied to provide said variable voltage generator an optimal performance.

20. The water treatment apparatus, as recited in claim 19, wherein said variable voltage generator comprises a power control, which is defined to output a voltage between Vmix=14V and Vmin=8.6V, and a storage battery for cooperating with said variable voltage generator, wherein said storage battery is of maintaining-free style and has a capacity in a range between 12–24 AH.

* * * * *